United States Patent
Myers et al.

(10) Patent No.: US 7,037,434 B2
(45) Date of Patent: May 2, 2006

(54) INTEGRATED WATER TREATMENT AND FLUE GAS DESULFURIZATION PROCESS

(75) Inventors: Ronald D. Myers, Calgary (CA); Mainak Ghosh, Calgary (CA); John B. MacLeod, Calgary (CA); Michael K. Bridle, Calgary (CA)

(73) Assignee: ExxonMobil Upstream Research Company, Houston, TX (US)

( * ) Notice: Subject to any disclaimer, the term of this patent is extended or adjusted under 35 U.S.C. 154(b) by 6 days.

(21) Appl. No.: 10/699,559

(22) Filed: Oct. 31, 2003

(65) Prior Publication Data

US 2004/0118783 A1   Jun. 24, 2004

(30) Foreign Application Priority Data

Dec. 20, 2002   (CA)   ................................ 2414949

(51) Int. Cl.
  *C02F 1/60*   (2006.01)
(52) U.S. Cl. .................. 210/718; 95/235; 166/267; 166/303; 210/712; 210/724; 210/737; 210/747; 423/243.01; 423/243.06; 423/243.08
(58) Field of Classification Search .............. 95/235; 166/267, 303; 210/712, 718, 724, 725, 737, 210/747; 423/243.01, 243.06, 243.08
See application file for complete search history.

(56) References Cited

U.S. PATENT DOCUMENTS

| | | | |
|---|---|---|---|
| 3,844,349 A | 10/1974 | Snavely, Jr. et al. ......... 166/272 |
| 3,880,237 A | 4/1975 | Snavely, Jr. et al. ......... 166/303 |
| 3,918,521 A | 11/1975 | Snavely, Jr. et al. ......... 166/272 |
| 4,077,777 A | 3/1978 | Henke ........................... 23/288 |
| 4,147,756 A * | 4/1979 | Dahlstrom et al. ........ 423/243.1 |
| 4,151,263 A | 4/1979 | Ciuryla et al. .............. 423/242 |
| 4,223,735 A | 9/1980 | Caldwell, Jr. et al. ....... 166/303 |
| 4,231,956 A | 11/1980 | Sullivan, III et al. ...... 260/465.8 |
| 4,231,995 A | 11/1980 | Campbell et al. ............ 423/242 |
| 4,321,241 A | 3/1982 | Bechthold ..................... 423/242 |
| 4,344,486 A | 8/1982 | Parrish .......................... 166/272 |
| 4,382,912 A | 5/1983 | Madgavkar et al. ......... 423/224 |
| 4,440,650 A | 4/1984 | Watson et al. ........... 252/8.55 D |
| 4,774,066 A | 9/1988 | Spevack ....................... 423/220 |
| 4,853,193 A | 8/1989 | Cahn et al. ................... 423/235 |
| 4,877,536 A | 10/1989 | Bertness et al. .............. 210/712 |
| 4,956,161 A | 9/1990 | Cahn et al. ................... 423/235 |
| 4,968,488 A | 11/1990 | Spevack ....................... 422/170 |
| 4,969,520 A | 11/1990 | Jan et al. ...................... 166/266 |
| 5,262,063 A * | 11/1993 | Yen .............................. 210/724 |

(Continued)

OTHER PUBLICATIONS

Betz Handbook of Industrial Water Conditioning, 7th Edition, 1976, pp. 46-52.*

*Primary Examiner*—Peter A. Hruskoci

(57) ABSTRACT

A water stream containing hardness minerals is subjected to a water treatment process using an alkali agent to precipitate the hardness minerals and to produce a softened water stream is used to create an integrated water treatment and flue gas desulfurization process. Thereafter, the softened, alkaline water stream is utilized in a scrubber to scrub a flue gas containing sulfur dioxide to produce a sulfur-lean flue gas. The invention may be applied to a steam-based bitumen recovery operation where bitumen, sour produced gas or other sulfur containing fuels are burned for producing steam for bitumen recovery. More specifically, the associated produced water from the bitumen recovery process may be softened for re-use and for utilization as a scrubbing agent for high-sulfur containing flue gas arising from the steam generators. The process provides an economically favorable process while minimizing waste disposal requirements.

21 Claims, 1 Drawing Sheet

U.S. PATENT DOCUMENTS

| | | | |
|---|---|---|---|
| 5,340,382 A | 8/1994 | Beard | 95/151 |
| 5,523,069 A | 6/1996 | Lin | 423/242.7 |
| 5,656,172 A | 8/1997 | Kitz et al. | 210/696 |
| 5,683,587 A | 11/1997 | Ferrara et al. | 210/696 |
| 5,961,837 A * | 10/1999 | Ferrara et al. | 210/696 |
| 6,149,344 A | 11/2000 | Eaton | 405/128 |
| 6,289,988 B1 | 9/2001 | Myers et al. | 166/267 |
| 6,383,261 B1 | 5/2002 | Myers et al. | 95/235 |
| 6,759,018 B1 * | 7/2004 | Arno et al. | 423/210 |

* cited by examiner

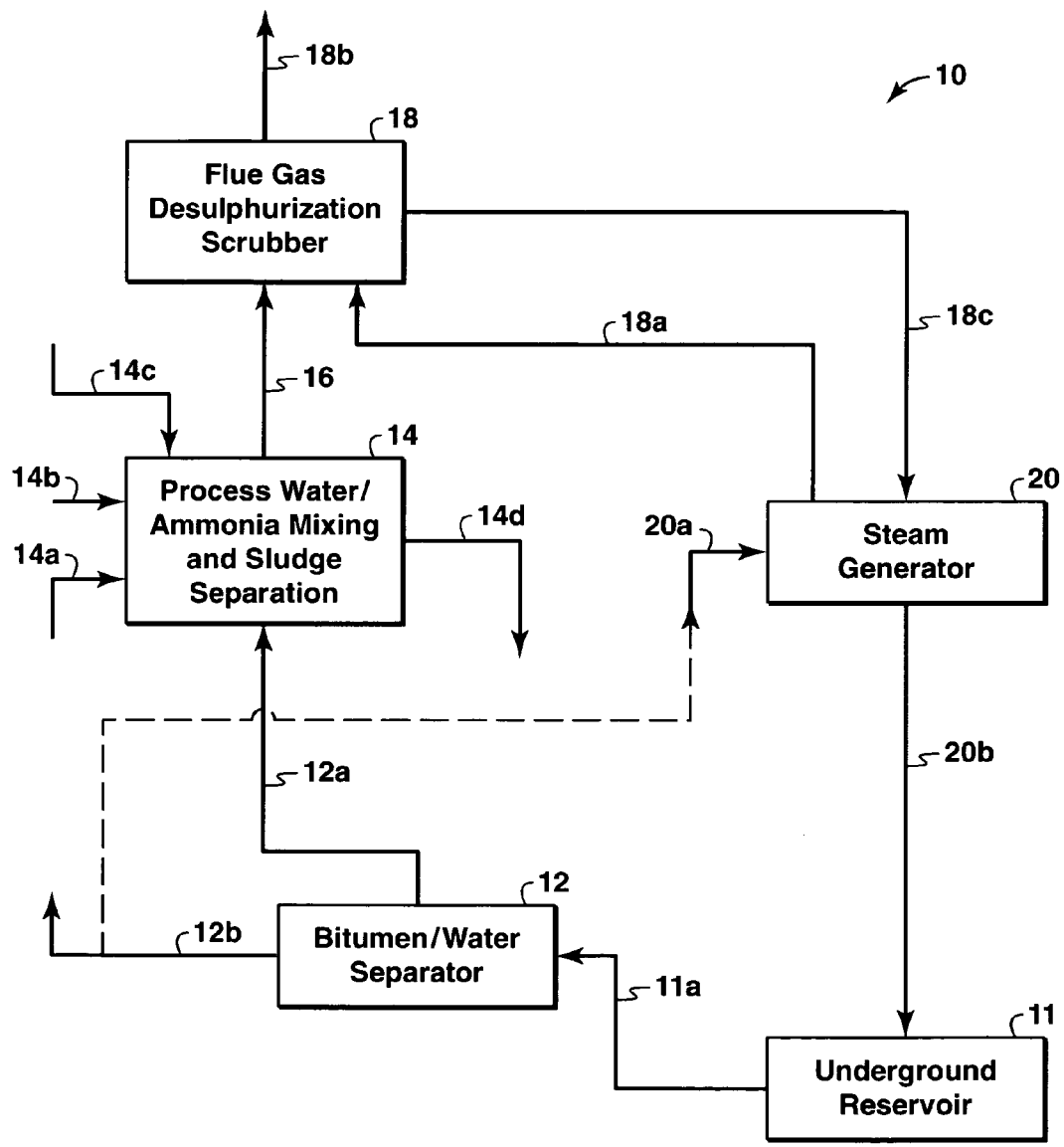

INTEGRATED WATER TREATMENT AND FLUE GAS DESULFURIZATION PROCESS

This application claims the benefit of Canadian Patent Application No. 2,414,949 filed Dec. 20, 2002.

FIELD OF INVENTION

The invention relates to an integrated water treatment and flue gas desulfurization process. More particularly, a water stream containing hardness minerals may be subjected to a water treatment process using a precipitating alkali agent to precipitate the hardness minerals and to produce a softened water stream.

BACKGROUND OF INVENTION

Heavy oil or bitumen can be produced from oil sands using a cyclic steam stimulation process. Steam generators are used to produce high-pressure steam, which is distributed and injected into the reservoir. Steam injection continues through a soak period until the oil viscosity is such that the oil can be pumped to the surface as a water/oil/gas mixture during the production part of the cycle and then returned to central plant facilities for separation and other downstream processing.

Steam generators may be fueled by a variety of different fuels to produce high-pressure steam for the extraction of bitumen from oil sands. Natural gas is the preferred fuel, but depending on its price, alternative fuels, such as whole bitumen or bitumen bottoms (resid, asphaltenes etc.) may be competitive. However, while alternative fuels may be price competitive, other problems may exist with their use including increased emissions due to the high sulfur content of such fuels. As a result, any use of bitumen as a fuel for bitumen recovery must include flue gas desulfurization ("FGD") as an integral part of the process. More specifically, it is required that with the use of such fuels that sufficient scrubbing of the flue gas is conducted to adequately remove $SO_2$ from the combustion emissions.

There are many commercial processes for FGD or scrubbing $SO_2$ from flue gas. One technology for FGD utilizes limestone slurry or variations thereof. With this technology, the lime reacts with $SO_2$ ultimately producing $CaSO_4$, which precipitates out as fine solids in a slurry. The slurry itself must be adequately disposed of, usually by landfill or other means. In another technology, the use of a second alkali species (Double Alkali System) can increase $SO_2$ removal and lower power consumption and scaling.

In a further technology, seawater can be used for scrubbing and is sometimes employed by power plants located in close proximity to the ocean. The inherent alkalinity of seawater (which may be supplemented with lime) reacts with and removes $SO_2$ with efficiencies as high as 95%. However, seawater scrubbing results in an acidic seawater that must be neutralized (usually through dilution) to buffer the pH to that of fresh seawater prior to disposal.

Yet another technique for removing $SO_2$ from flue gas involves scrubbing the gas with an aqueous solution of sodium hydroxide or ammonia. Conventional soluble alkali processes display efficient sulfur dioxide removal from flue gases. Ammonia-based sulfur scrubbing processes are described in the art and employ heat, acidification and crystallization techniques. However, ammonia-based techniques are disadvantaged having regard to the requirement of purchasing, storing and mixing the ammonia, as well as disposing of the resulting waste material. In some cases it is advantageous to employ forced oxidation of the reaction product and manufacture fertilizer from the resulting ammonium sulfate.

It is also known that alkaline materials including ammonia may be used to soften industrial process water by increasing the pH and precipitating $CaCO_3$ and $MgCO_3$. These processes are limited by the cost of the precipitating reagents compared to other options including the use of hydrated lime ($Ca(OH)_2$). It is similarly known that basic materials such as aqueous sodium hydroxide or ammonium hydroxide (aqueous ammonia) may be used for scrubbing the acidic $SO_2$ from flue gas. Again, these reagents typically have limited application due to the cost of the scrubbing reagents and the associated cost of waste disposal.

Thus, while individual processes for independently scrubbing $SO_2$ and softening water are known, there continues to be a need for low cost processes. One way to achieve this cost reduction is to integrate water softening with flue gas desulfurization wherein only one chemical is required for both processes thereby resulting in a reduced cost and a significant reduction of waste material.

A review of the prior art reveals that such an integrated process has not been utilized. For example U.S. Pat. No. 5,683,587 discloses the use of reaction sludge produced from soda ash and lime treatment of seawater in FGD applications. More specifically, this patent teaches that ammonia (among other alkaline materials) may be added to the scrubber or ammonia may be added to the waste sludge to alkalinize it. U.S. Pat. No. 5,961,837 is a continuation of U.S. Pat. No. 5,683,587 and further discloses the use of biocides, corrosion inhibitors, polymers etc. in a variety of treatment applications. U.S. Pat. No. 4,321,241 teaches desulfurization of flue gas containing $SO_2$, $CO_2$ and other acidic components by washing in aqueous washing solution to which ammonia has been added in stoichiometrically necessary amounts for reaction with the sulfur oxides.

U.S. Pat. No. 4,853,193 teaches flue gas containing $SO_x$ and $CO_x$ reacting with excess ammonia to reduce the $NO_x$ to $N_2$. Unreacted ammonia and $SO_x$ are passed to a gas desulfurization zone to form an ammonium salt of an acid of sulfur which can be recovered and used as such or converted to elemental sulfur. U.S. Pat. No. 4,956,161 teaches a gas desulfurization process utilizing aqueous compositions of ammonium carbonate and ammonium bicarbonate and mixtures thereof.

U.S. Pat. No. 4,151,263 teaches a controlled process for the removal of sulfur oxides from gases by scrubbing with ammoniacal solutions in such a manner that the formation of sub-micron liquid particles is prevented at any point during the scrubbing operation, thereby preventing the formation of a plume emission in the vapour effluent from scrubbing.

U.S. Pat. No. 4,231,9956 teaches an ammonia double-alkali process for removing sulfur oxides from stack gases.

U.S. Pat. No. 6,289,988 teaches a process for the management of $H_2S$ containing gas streams and high alkalinity water streams where the $H_2S$ is selectively removed from the gas stream and combusted to form an $SO_2$ rich waste gas stream. The $SO_2$ gas stream is then scrubbed with the water stream to substantially remove the $SO_2$ from the gas while subsequent treatment of the water such as softening or settling is improved. The capacity of this produced water to scrub $SO_2$ is limited by its alkalinity content and the volume of water available for scrubbing. In other industrial application such as the combustion of high sulfur fuels such as coal or bitumen reside where the mass of $SO_2$ requiring scrubbing exceeds the capacity of the produced water alkalinity, the scrubbing capacity of the water needs to be enhanced or supplemented.

Other examples of prior art process include those described in U.S. Pat. No. 6,383,261 which describes a process for management of industrial wastes including a water softening process, U.S. Pat. No. 6,149,344 which describes a process for acid gas disposal, U.S. Pat. No. 5,340,382 which describes an acid gas absorption process, U.S. Pat. No. 4,969,520 which describes a steam injection process for recovering heavy oil, U.S. Pat. No. 4,077,777 which describes a process for the neutralization of gases, U.S. Pat. No. 5,523,069 which describes a method for removing carbonyl sulfide from fluids, U.S. Pat. No. 4,774,066 which describes a process for purifying steam, and U.S. Pat. No. 4,968,488 which describes a process for removing hydrogen sulfide contaminants from steam.

SUMMARY OF INVENTION

In accordance with the invention, there is disclosed an integrated water treatment and flue gas desulfurization process comprising (a) subjecting a water stream containing hardness minerals to a water treatment process using a precipitating alkali agent to precipitate the hardness minerals and to produce a softened alkaline water stream; and, (b) utilizing the softened alkaline water stream to scrub a flue gas containing sulfur dioxide to produce a sulfur-lean flue gas.

In accordance with a preferred embodiment the precipitating alkali agent is ammonia (or aqueous ammonia) but may also include any one of or a combination of sodium carbonate, sodium hydroxide, or magnesium oxide. For clarification, soda ash may be added to increase the concentration of carbonate in the water, which can result in improved hardness reduction. Magnesium oxide may be optionally added if silica removal is also required.

In another embodiment, the process is integrated with a steam injection bitumen recovery operation where step (b) further produces a treated water stream rich in sulfite/bisulfite for steam generation and underground steam injection and the water stream for step (a) is a produced water stream recovered from an underground reservoir. In yet another embodiment step (a) includes a separation process to separate mineral precipitates from the softened water stream.

In accordance with more specific embodiments, the water stream for step (a) has a temperature of approximately 85 to 100 degrees Celcius (° C.), and/or the alkali precipitating agent is a combination of excess ammonia or a combination of excess ammonia and magnesium oxide (where the latter is added for silica removal). In step (a) the pH of the water stream is preferably raised to 8.5 or higher or to 9.3 or higher and the treated water effluent stream from step b) has a pH of 6.8–7.2. Further still, step (a) may include the pre-addition of carbon dioxide gas or soda ash ($Na_2CO_3$) as a source of carbonate to assist in precipitating calcium/magnesium carbonate. This $CO_2$ can be a slipstream from the treated flue gas.

In accordance with another more specific embodiment, an integrated water treatment and flue gas desulfurization process is provided comprising the steps of (a) subjecting produced water containing hardness minerals and recovered from an underground reservoir in a steam injection bitumen recovery operation to a water treatment process using a precipitating alkali agent selected from any one of or a combination of ammonia, aqueous ammonia or sodium hydroxide, (sodium carbonate or carbon dioxide may be optionally added to increase the carbonate content of the water and aid Ca/Mg carbonate precipitation; magnesium oxide may be optionally added for silica removal) to precipitate the hardness minerals and after separation of the precipitated calcium/magnesium carbonate sludge to produce a softened alkaline water stream; and, (b) utilizing the softened alkaline water stream to scrub a flue gas containing sulfur dioxide to produce a sulfur-lean flue gas and a treated water stream rich in sulfite/bisulfite for steam generation and underground steam injection.

DESCRIPTION OF DRAWINGS

FIG. 1 is a schematic diagram of an integrated water treatment and flue gas desulfurization process in accordance with one embodiment of the invention.

DETAILED DESCRIPTION OF THE INVENTION

The invention relates to an integrated water treatment and flue gas desulfurization process in which a water stream containing hardness minerals may be subjected to a water treatment process using a precipitating alkali agent to precipitate the hardness minerals and to produce a softened water stream. Thereafter, the softened, alkaline water stream may be utilized in a scrubber to scrub a flue gas containing sulfur dioxide to produce a sulfur-lean flue gas. The invention is particularly useful in a steam-based bitumen recovery operation where bitumen, sour produced gas or other sulfur containing fuels are burned for producing steam for bitumen recovery. More specifically, the associated produced water from the bitumen recovery process may be softened for re-use and for utilization as a scrubbing agent for high-sulfur containing flue gas arising from the steam generators. The process provides an economically favorable process while minimizing waste disposal requirements.

Combustion of high sulfur fuels (along with supplemental fuels which may contain methane with lesser amounts of $CO_2$ and other lower alkanes and $H_2S$) results in the formation of $SO_2$ in the flue gas. In order to meet environmental emission requirements, the $SO_2$ must be removed from the flue gas through flue gas desulfurization (FGD) processes.

With reference to FIG. 1, an integrated process for water treatment and flue gas desulfurization in a steam-based bitumen recovery process is described. The process 10 subjects a produced water/bitumen stream 11a (containing water, dissolved minerals and bitumen) from an underground reservoir 11 to a separation process 12 to produce produced water 12a and bitumen 12b. The produced water 12a is subjected to a water treatment process 14 using sufficient alkali agent for both softening and subsequent flue gas desulfurization. Suitable alkali agents include ammonia 14a and may include other alkaline agents 14c such as aqueous ammonia or sodium hydroxide. While the use of ammonia is referenced as the primary alkali agent herein, it is understood that other alkali agents may be utilized. Alternatively, ammonium carbonate or ammonium bicarbonate could also be used, if readily available at economic prices. Other reagents 14b such as sodium carbonate and carbon dioxide may optionally be added to enhance hardness removal and magnesium oxide may be optionally added if silica removal is desired. The calcium carbonate and silicon dioxide may be removed from the water treatment process as sludge 14d.

Preferably, the amount of ammonia injection is stoichiometric (or in slight excess) to the amount of $SO_2$ in flue gas to produce a softened water stream 16 rich in aqueous $NH_3$ and $NH_4^{+OH^-}$ and a waste carbonate sludge. This softened water stream 16 is used in a scrubber 18 to scrub a high-sulfur flue gas 18a from a steam generation process 20 (burning a high sulfur fuel 20a) to produce a clean flue gas 18b and a clean, slightly alkaline, sulfite rich water stream 18c or as neutralized flue gas treated water. This clean water stream 18c may be subsequently used as boiler feed water to generate steam 20b for underground injection for the bitumen recovery process. The fuel for the steam generator may be a portion of the bitumen 12b including bitumen resid or asphalt 20a.

While the process in accordance with the invention is described in the context of the production of bitumen from oil sands through cyclic steam stimulation and the use of high sulfur fuels for steam generation as described above, the invention is also applicable to the integration of water treatment and flue gas treatment in other operations including those processes in which high sulfur fuels (such as bitumen resid or coal) may be combusted.

Water Treatment Process

In accordance with the invention, produced water 12a is subjected to a water softening process 14 in a mixing and sludge separation vessel utilizing an alkali precipitating agent, preferably ammonia. Other alkali precipitating agents including aqueous ammonia and NaOH, may also be added. Other reagents 14b such as $CO_2$ or $Na_2CO_3$ may be added to enhance hardness precipitation.

The ammonia and/or alkaline agents are added to the produced water 12a at an appropriate molar ratio and in quantities sufficient to raise the pH to about 8.5 to 9.3 (preferably at about 85° C. to 100° C. to enhance reaction kinetics). The amount of ammonia necessary will vary depending upon the specific water chemistry (e.g. buffering capacity and hardness content). Magnesium oxide (MgO) may optionally be added in order to facilitate precipitation and removal of silica, which does not otherwise occur. Precipitated $Ca/MgCO_3$ or $Ca/MgCO_3$/silica sludge 14b settles quickly and may be removed via a settling vessel or hydrocyclone or other separation process as is known in current practice in order to prevent re-dissolution during flue gas scrubbing where the pH is reduced.

In comparison to other water softening process such as traditional hot lime softening processes, the mass of sludge produced by the ammonia treatment process requiring disposal is a fraction (typically less than 50 percent) of the mass of sludge from, for example, hot lime softening.

Alternatively, the sludge produced by the ammonia softening process may also be used as a flue gas desulfurization reagent in a separate process stream to avoid re-dissolution of the hardness ions into the produced water. In this process, the calcium carbonate sludge is converted to calcium sulfite or calcium sulfate which can then be disposed.

Thus, the invention integrates the use of ammonia (and NaOH and other alkaline materials) to first soften industrial process water and then subsequently utilizes this soft alkaline water to scrub $SO_2$ from flue gas. In the case of ammonia, the $SO_2$ is converted to soluble ammonium bisulfite or ammonium sulfite. The overall chemistry of water softening and FGD utilizing ammonia is as follows:

Water Softening:

$$NH_3 + H_2O \rightarrow NH_4^+ + OH^-$$

$$M(HCO_3)_2 + NH_4OH \rightarrow MCO_3\downarrow + NH_4HCO_3 + H_2O,$$
$$M = Ca \text{ or } Mg$$

where

FGD:

$$SO_2 + 2H_2O \rightarrow HSO_3^- + H_3O^+$$

$$SO_2 + NH_3 + H_2O \rightarrow [NH_4^+][HSO_3^-]$$

$$SO_2 + 2NH_3 + 2H_2O \rightarrow [NH_4^+]_2[SO_3^{2-}]$$

Sufficient ammonia is added to both initially soften the process water (precipitated as $Ca/MgCO_3$ sludge which is removed) and to subsequently scrub $SO_2$ from flue gas generated by burning a sulfur containing fuel. Preferably, the final pH of the water after FGD should preferably be maintained at about 7 (approximately between 6.8–7.2) and optimized for maximum $SO_2$ removal in order to minimize both $SO_2$ and ammonia stack emissions. Control of the pH at about 7 will also avoid potential corrosion concerns, particularly at a lower pH.

Softened, ammoniacal process water used to scrub $SO_2$ containing flue gas results in the formation of soluble ammonium bisulfite/sulfite, avoiding the formation of precipitate or sludge. This water may be used as boiler feed water since the hardness has been removed and monovalent ions will not promote scaling in the absence of divalent cations such as Mg and Ca. Depending on the concentration of Ca and Mg in the produced water after ammonia softening and boiler feed water quality requirements, the water may require a final polishing step in a weak acid cation exchange unit to reduce final hardness to less than 0.5 ppm.

In the case where high-pressure steam is generated using the resulting bisulfite/sulfite rich water and injected into an oil sands reservoir to facilitate bitumen recovery, the concentration of soluble ammonium bisulfite/sulfite in the recycled produced water will eventually reach a steady state concentration. This has been observed in the cyclic steam stimulation process where the competing phenomena of mineral dissolution and precipitation (neogenesis) in the reservoir have established a steady-state concentration of the total dissolved solids ("TDS") content of the water. As such, the $SO_2$ removed from the flue gas by the ammoniacal water is ultimately returned to the reservoir as a sulfite or sulfate mineral. Reactive transport geochemical modeling supports this assertion.

The benefit of the above approach is that the water softening process and flue gas desulfurization process may be integrated by using a single chemical reagent to accomplish both water softening and FGD. Additional ammonia over and above that required for FGD is not required for softening since the hydroxide alkalinity resulting from ammonia addition causes calcium to precipitate as calcium carbonate. Furthermore, the softened, flue-gas treated water may be recycled directly for steam generation as in thermal bitumen recovery and power generation where no waste stream from the FGD process is created. In the case of thermal recovery of bitumen, the sulfur removed from the flue gas is ultimately deposited in the petroleum reservoir via neogenesis processes so that the concentration of ammonium sulfite/bisulfite in the process water reaches a steady state.

The integrated water softening and flue gas desulfurization process reduces the costs of water softening. Other alkaline materials, such as NaOH can be used if cost, availability and process compatibility are favorable.

The flue gas-treated water may also be advantageous to associated industrial processes in that the sulfite produced as a result of the scrubbing chemistry is an effective oxygen scavenger and reacts with dissolved oxygen to form sulfate. This is important in the present process where oxygen in the flue gas may dissolve in the produced water potentially increasing its corrosivity. The high concentrations of bisulfite and sulfite formed in the FGD process will effectively remove any dissolved oxygen and eliminate this concern.

EXAMPLES

Chemical reaction computer modeling experiments and laboratory experiments with actual produced fluids and gases were carried out. In the chemical modeling experiments, oilfield produced water at 85° C. with the chemical composition shown in Table 1, was mixed with 21° C. gaseous ammonia so that the final concentration of ammonia was 914 ppm. This concentration of ammonia in the produced water stream was selected so as to be in a 1:1 molar ratio with the $SO_2$ in the flue gas that would be added in the second stage of the process.

TABLE 1

Composition of a Typical Oilfield Produced Water

| | |
|---|---|
| Ca (ppm) | 69 |
| Mg (ppm) | 3 |
| Na (ppm) | 3860 |
| K (ppm) | 260 |
| Fe (ppm) | 1.6 |
| Ba (ppm) | 1.3 |
| Sr (ppm) | 2 |
| Li (ppm) | 10 |
| pH | 6.9 |
| Cl (ppm) | 5825 |
| $HCO_3^-$ (ppm) | 527 |
| $OH^-$ (ppm) | <0.5 |
| $CO_3^{2-}$ (ppm) | <0.5 |
| $SO_4^{2-}$ (ppm) | 74 |
| $SiO_2$ (ppm) | 160 |
| B (ppm) | 92 |
| S (ppm) | 34 |
| P (ppm) | 1.3 |

The pH of the water after mixing with ammonia was 8.6 at 85° C. and the concentration of dissolved Ca in the water was reduced from 69 to 0.6 ppm. The balance of the calcium was precipitated as 166 ppm of $CaCO_3$. A similar result was observed when the concentration of ammonia was doubled to 1828 ppm (the mass of ammonia addition relative to the mass of $SO_2$ in flue gas remained constant), although in this case the pH of the water was raised to 8.9.

In the second stage of the chemical modeling, flue gas with a composition as shown in Table 2 below were mixed with this softened ammoniacal water.

TABLE 2

Synthetic Flue Gas Composition

| | |
|---|---|
| $N_2$ (vol %) | 71.2 |
| $CO_2$ (vol %) | 9 |
| $O_2$ (vol %) | 1 |
| $H_2O$ (vol %) | 18.4 |
| $SO_2$ (vol %) | 0.4 |

The $SO_2$ concentration in the flue gas was reduced from 4000 ppm to 21 ppm, representing 99.5% $SO_2$ capture. The pH of the process water after flue gas addition was reduced to 6.0. In commercial practice, an excess of ammonia will be required to maintain the process water pH above 7, particularly when this water is used as boiler feed water. Similar results were obtained via chemical modeling when the ammonia was replaced with an equimolar amount of sodium hydroxide. These computer modeling predictions have since been verified in the field with a 5000 $m^3$/d flue gas pilot unit.

These chemical reaction-modeling results were also verified in the laboratory with actual produced fluids, synthetic flue gas that contained 3000 ppm $SO_2$, and gaseous $NH_3$. The results from several experiments under different conditions are reported in Table 3.

TABLE 3

Ammonia Addition t Produced Water

| Experiment | T (° C.) | Initial pH | Final pH | Ca (ppm) | Mg (ppm) | Si (ppm) |
|---|---|---|---|---|---|---|
| Produced water | | 7.14 | | 125 | 4.9 | 105.9 |
| 1 | 85 | 7.14 | 8.75 | 20.1 | 3.9 | 97.6 |
| 2 | 85 | 5.88 | 9.28 | 7.9 | 4.3 | 108 |
| 3 | 85 | 7.14 | 9.5 | 3.7 | 1 | 29.1 |

In experiment 1 above, produced water was heated to about 85° C. followed by 21° C. gaseous $NH_3$ addition which was followed by rapid settling. As shown in Table 3, the concentration of calcium was reduced from 125 ppm to 20.1 ppm. Although this represents a substantial reduction in dissolved calcium concentration, the reduction in calcium is not as complete as predicted by chemical modeling. In experiment 2, $CO_2$ was first bubbled through the water prior to heating and ammonia addition in order to increase the concentration of $HCO_3^-$. As seen in Table 3, the addition of $CO_2$ initially reduced the pH to 5.88 and it was subsequently raised to 9.28 by addition of ammonia. In this case the dissolved calcium concentration was further reduced to 7.9 ppm. The produced water sample used in these experiments was collected from the field many weeks prior to this experiment and this could lead to a reduction in dissolved $CO_2$ in the water as a result of degassing. Bubbling $CO_2$ through the water prior to ammonia addition increases the concentration of $HCO_3^-$ which facilitates precipitation of Ca as $CaCO_3$.

In experiment 3 above, 200 ppm of $Na_2CO_3$ was first added to the produced water to provide additional $HCO_3^-$ ion. 200 ppm of MgO was also first added to facilitate silica removal. This addition of these reagents resulted in a further reduction in the concentration of calcium and magnesium and a substantial new reduction in Si. The addition of $CO_2$ or $Na_2CO_3$ is likely not required in an oilfield application where there is likely sufficient bicarbonate alkalinity in the produced water to promote precipitation of hardness at high pH. MgO addition is however typically required to remove silica by precipitation and as such would be an integral part of the water treatment process described here if high silica concentrations are a concern.

In a final series of laboratory experiments to demonstrate the integration of produced water softening and FGD, 21° C. ammonia was added to 85° C. produced water so that the final pH was 9.5. This was followed by the addition of 21° C. synthetic flue gas that contained 3000 ppm $SO_2$. 100 mg of $Na_2CO_3$ and 100 mg of MgO were also added to the produced water prior to ammonia addition to facilitate calcium and silica removal, respectively. Samples were collected as the pH was reduced with flue gas addition, filtered to remove precipitated solids and analyzed for dissolved Ca, Mg and Si. The results of this experiment are reported in Table 4 below which shows the concentration of soluble Ca, Mg and Si as a function of flue gas addition and hence pH.

TABLE 4

Water Composition as a Function of pH with Flue Gas Addition

| pH | Ca (ppm) | Mg (ppm) | Si (ppm) |
|---|---|---|---|
| Produced water - 7.14 | 125 | 4.9 | 105.9 |
| 9.5 | 3.6 | 2.7 | 16.5 |
| 9.0 | 1.7 | 1.9 | 35.8 |
| 8.5 | 1.5 | 4.7 | 31.4 |
| 8.0 | 2.4 | 9.3 | 32.4 |
| 7.5 | 6.6 | 24.0 | 38.1 |
| 7.0 | 56.5 | 95.2 | 73.6 |

As with the examples above, the addition of ammonia to produced water (with small amount of added $Na_2CO_3$ and MgO) results in substantial reduction of Ca, Mg and Si at pH 9.5. As the pH is then reduced by the addition of flue gas, Si begins to re-dissolve at pH 9.0. The magnesium concentration begins to rise substantially at pH 8.0 at which point the added MgO begins to dissolve. By pH 7.0 there is extensive dissolution of Ca, Mg and Si. The effluent gas from this experiment was measured for $SO_2$ concentration using an electronic flue gas analyzer and at pH 7.1 no $SO_2$ was detected. This indicates that the ammoniacal water effectively scrubbed $SO_2$ from the flue gas.

These data show that the best silica reduction occurs at pH 9.5 and that the precipitated solids should be removed at this pH and prior to the addition of flue gas. Otherwise silica begins to re-dissolve at pH 9.0 followed by the other ions at lower pH.

The integrated ammonia softening/flue gas desulfurization process has also been demonstrated in a field pilot test at Cold Lake, Alberta using oilfield produced water and a slip-stream of flue gas from a commercial boiler. Since the concentration of $SO_2$ in the boiler flue gas is typically only about 100 to 150 ppm, liquid $SO_2$ was injected into the flue gas slip-stream during this test to increase the concentration of $SO_2$ in the flue gas going to the FGD scrubber to about 4000 ppm. The concentration of $SO_2$ in the flue gas stream was increased to 4000 ppm to simulate emissions conditions that would exist for a boiler burning fuel with a high sulfur content.

In a typical ammonia softening test, produced water at a temperature of 85° C. at an average rate of 20 m³/hr was flowed through a water clarifier/separation vessel. Aqueous ammonia was injected directly into a down-corner in a clarifier so that the average concentration of ammonia in the water was about 350 ppm and the pH was about 9.0 to 9.3. It was observed that calcium carbonate precipitation in the clarifier was very rapid so that the hardness concentration of the clear water exiting the clarifier was reduced as per Table 5 below.

TABLE 5

Ammonia Softening Results from Field Pilot Test

| Test # | Initial pH | Final pH | Initial Hardness (as ppm $CaCO_3$) | Final Hardness (as ppm $CaCO_3$) |
|---|---|---|---|---|
| 1 | 7.0 | 9.2 | 229 | 35 |
| 2 | 6.9 | 9.2 | 239 | 38 |
| 3 | 6.9 | 9.3 | 236 | 35 |
| 4 | 6.8 | 9.3 | 235 | 31 |
| 5 | 6.9 | 9.2 | 263 | 32 |

As can be seen in Table 5, the initial produced water pH was about 6.8 to 7.0 whereas the initial hardness concentration (Ca and Mg as ppm of $CaCO_3$) was about 230 to 260 ppm. When aqueous ammonia was added so that the pH was increased to 9.2 to 9.3 (about 350 wppm $NH_3$), the hardness was reduced to about 35 ppm. Based on laboratory data, it is expected that the hardness removal would be even greater if the temperature was increased from 85 to 100° C.

In the second step of the integrated process in the field test where the softened, ammoniacal water from the clarifier (as per Table 5) was flowed through the FGD scrubber tank as the flue gas desulfurization reagent, and where the concentration of $SO_2$ in the flue gas was 4000 ppm as described above, very high FGD efficiencies were observed. Table 6 below shows the test conditions and results for the FGD component of the integrated field test. The FGD process was controlled so that the pH of the water exiting the scrubber was reduced from its initial value of 9.0 to 9.3 to about 6.8 to 7.2. Under these conditions the highest $SO_2$ capture efficiencies were observed and both $NH_3$ and $SO_2$ stack emissions as measured by an in situ stack analyzer were minimized.

TABLE 6

Field Pilot FGD Test Conditions and Results

| Flue Gas Flow Rate | 5500 m³/hr |
|---|---|
| [$SO_2$] in Flue Gas | 4000 ppm |
| FGD Efficiency | >99.5% |
| Ammoniacal Water pH | 9.0 to 9.3 |
| Optimum FGD Outlet pH | 6.8 to 7.2 |
| Measured $NH_3$:$SO_2$ Molar Ratio | ~1.3 |

The invention claimed is:

1. An integrated water treatment and flue gas desulfurization process comprising:
    (a) subjecting a water stream containing hardness minerals to a water treatment process using an alkali agent to precipitate the hardness minerals and raise the pH of the water stream to at least about 8.5, thereby producing a softened alkaline water stream having a pH of at least about 8.5; and
    (b) utilizing the softened alkaline water stream having a pH of at least about 8.5 to scrub a flue gas containing sulfur dioxide to produce a sulfur-lean flue gas, wherein said flue gas containing sulfur dioxide is produced by burning a high-sulfur fuel.

2. The process of claim 1 wherein the precipitating alkali agent is ammonia or aqueous ammonia.

3. The process of claim 1 wherein step (a) comprises the addition of sodium carbonate, carbon dioxide, sodium hydroxide, or magnesium oxide, or any combination thereof.

4. The process of claim 3 wherein the $CO_2$ can be a slipstream of the treated flue gas.

5. The process of claim 1 wherein the process is integrated with a steam injection bitumen recovery operation where step (b) further produces a treated water stream rich in sulfite/bisulfite for steam generation and underground steam injection and the water stream for step (a) is a produced water stream recovered from an underground reservoir.

6. The process of claim 5 wherein the treated water stream has a pH of at least 6.8 and not more than 7.2.

7. The process of claim 1 wherein step (a) includes a separation process to separate mineral precipitates from the softened water stream.

8. The process of claim 1 wherein the water stream for step (a) has a temperature of at least 85 degrees Celsius and not more than 100 degrees Celsius.

9. The process of claim 1 wherein step (a) includes addition of carbon dioxide gas or sodium carbonate as a source of carbonate for precipitating calcium carbonate.

10. The process of claim 1 wherein the alkali precipitating agent is a combination of excess ammonia and magnesium oxide.

11. The process of claim 1 wherein in step (a) the pH of the water stream is raised to at least 9.3.

12. The process of claim 1 wherein the high sulfur fuel is bitumen.

13. The process of claim 1 wherein the high sulfur fuel is bitumen resid.

14. The process of claim 1 wherein the high sulfur fuel is asphalt.

15. An integrated water treatment and flue gas desulfurization process comprising:
(a) subjecting produced water containing hardness minerals and recovered from an underground reservoir in a steam injection bitumen recovery operation to a water treatment process using an alkali agent selected from the group consisting of ammonia, aqueous ammonia, and sodium hydroxide, and any combination thereof to precipitate the hardness minerals and raise the pH of the produced water to at least about 8.5, thereby producing a softened alkaline water stream having a pH of at least about 8.5; and,
(b) utilizing the softened alkaline water stream having a pH of at least about 8.5 to scrub a flue gas containing sulfur dioxide to produce a sulfur-lean flue gas and a treated water stream rich in sulfite/bisulfite for steam generation and underground steam injection, wherein said flue gas containing sulfur dioxide is produced by burning a high sulfur fuel.

16. The process of claim 15 wherein step (a) includes a separation process to separate mineral precipitates from the softened water stream.

17. The integrated water treatment and flue gas desulfurization process of claim 15 wherein step (a) includes the addition of magnesium oxide for silica removal.

18. The process of claim 15 wherein step (a) includes the addition of carbon dioxide or sodium carbonate to enhance the precipitation of hardness minerals.

19. The process of claim 15 wherein the high sulfur fuel is bitumen.

20. The process of claim 15 wherein the high sulfur fuel is bitumen resid.

21. The process of claim 15 wherein the high sulfur fuel is asphalt.

* * * * *